US008503205B2

(12) United States Patent
Carletti et al.

(10) Patent No.: US 8,503,205 B2
(45) Date of Patent: *Aug. 6, 2013

(54) AC/DC CONVERTER WITH A PFC AND A DC/DC CONVERTER

(71) Applicants: Andrea Carletti, Munich (DE); Albino Pidutti, Villach (AT)

(72) Inventors: Andrea Carletti, Munich (DE); Albino Pidutti, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,046

(22) Filed: Oct. 26, 2012

(65) Prior Publication Data
US 2013/0051096 A1    Feb. 28, 2013

Related U.S. Application Data

(63) Continuation-in-part of application No. 13/117,572, filed on May 27, 2012.

(51) Int. Cl.
*H02M 1/00* (2007.01)
(52) U.S. Cl.
USPC .................. 363/78; 363/79; 363/80

(58) Field of Classification Search
USPC .................. 363/74, 78, 79, 80, 126, 127, 131
See application file for complete search history.

(56) References Cited

U.S. PATENT DOCUMENTS

| 6,882,551 B2 * | 4/2005 | Shimada et al. ........... 363/79 |
| 7,088,081 B2 * | 8/2006 | Takahashi et al. ......... 323/222 |
| 7,453,248 B2 * | 11/2008 | Takeuchi ................. 323/285 |
| 8,184,456 B1 * | 5/2012 | Jain et al. .............. 363/21.02 |
| 2012/0201061 A1 * | 8/2012 | Hampo et al. ............. 363/74 |

OTHER PUBLICATIONS

"Power Factor," Wikipedia Encyclopedia (www.wikipedia.org), Retrieved from: http://en.wikipedia.org/wiki/Power_factor#Power_factor_correction_in_non-linear_loads, Last modified: Mar. 22, 2011, 8 pages.
"Buck Converter," Wikipedia Encyclopedia (www.wikipedia.org), Retrieved from: http://en.wikipedia.org/wiki/Buck_converter, Last modified: Mar. 25, 2011, 12 pages.
"DC-to-DC Converter," Wikipedia Encyclopedia (www.wikipedia.org), Retrieved from: http://en.wikipedia.org/wiki/DC-to-DC_converter, Last modified: Mar. 26, 2011, 5 pages.

* cited by examiner

*Primary Examiner* — Adolf Berhane
*Assistant Examiner* — Lakaisha Jackson
(74) *Attorney, Agent, or Firm* — Slater & Matsil, L.L.P.

(57) ABSTRACT

Disclosed is a power converter including a power factor corrector and a DC/DC converter and a power conversion method.

31 Claims, 6 Drawing Sheets

AC/DC CONVERTER WITH A PFC AND A DC/DC CONVERTER

This patent application is a continuation in part application to U.S. patent application Ser. No. 13/117,572 filed on May 27, 2012, which application is hereby incorporated herein by reference in its entirety.

TECHNICAL FIELD

The present invention relates to a power converter circuit, in particular to a power converter circuit with a power factor corrector (PFC) and a DC/DC converter coupled to the PFC.

BACKGROUND

Many electronic devices, such as computers, TV sets, etc. or batteries that have to be charged, require a DC voltage as an input voltage, while the supply voltage that is available from the power grid is an AC voltage. In these cases an AC/DC conversion, that converts the AC input voltage into a DC output voltage, is required. Particularly in those cases, in which the power consumption of the load is higher than several 10 Watts, additionally to the power conversion a power factor correction is required. The power factor correction serves to minimize the reactive power and to maximize the real power taken from the grid.

An AC/DC converter that provides power factor correction includes a power factor corrector (PFC) and a DC/DC converter coupled to the PFC. The PFC is usually a boost converter that generates a DC voltage that is higher than the amplitude (peak value) of the AC input voltage. The DC/DC converter converts the DC voltage provided by the PFC into a DC output voltage supplied to the load voltage. The input voltage as well as the input current of the PFC have a sine waveform. When the power factor of the PFC is close to 1, such as between 0.97 and 1, the input voltage and the input current are almost in phase, so that the input power of the PFC has a squared sine ($sin^2$) waveform that cause ripples of the PFC output voltage. In order to reduce the amplitude of those ripples a capacitor, that is also referred to as DC link capacitor, is connected between output terminals of the PFC.

The DC link capacitor may have a capacitance of up to several mF (Millifarads) and is usually implemented as an electrolytic capacitor. However, electrolytic capacitors have a relatively short lifetime, have high leakage currents, and are expensive.

There is, therefore, a need to provide an AC/DC power converter circuit with a PFC and a DC/DC converter in which the size of the DC link capacitor can be reduced without degrading the power conversion efficiency and without increasing ripples of a DC voltage at the output of the DC/DC converter.

SUMMARY

A first aspect relates to a power conversion circuit, including a power factor corrector with input terminals for receiving an AC input voltage, and output terminals for providing a first output voltage, and a DC/DC converter with input terminals coupled to the output terminals of the power factor corrector, and output terminals for providing a second output voltage. The DC/DC converter further includes a control circuit is configured to control an input current of the DC/DC converter dependent on a reference signal, the reference signal having a frequency that is dependent on a frequency of the AC input voltage.

A second aspect relates to an AC/DC power conversion method. The method includes generating a power factor controlled first output voltage from an AC input voltage, and generating a second output voltage from the first output voltage. Generating the second output voltage includes generating a clocked voltage from the first output voltage, the clocked voltage having a frequency and a duty cycle, and rectifying the clocked voltage using an inductive rectifier arrangement. The duty cycle of the clocked voltage is dependent on a reference signal, wherein the reference signal has frequency that is dependent on a frequency of the AC input voltage.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
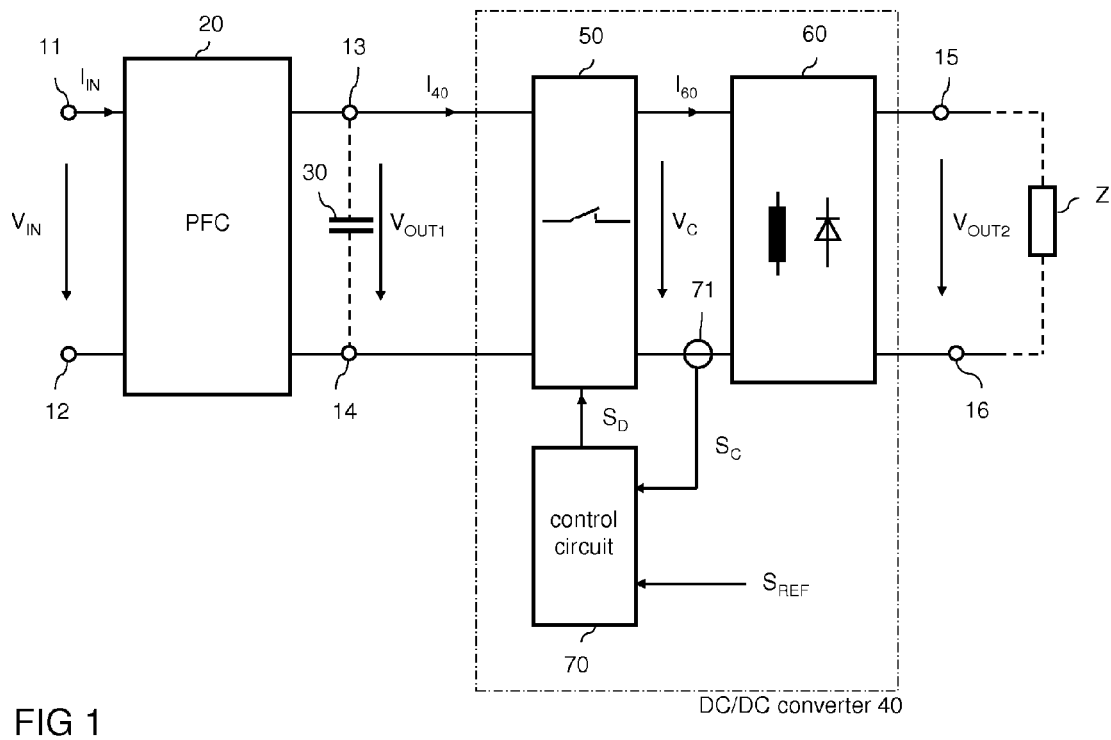
FIG. 1 schematically illustrates an embodiment of an AC/DC converter including a power factor corrector (PFC) and a DC/DC converter coupled to the PFC.

FIG. 1 schematically illustrates an exemplary embodiment of an AC/DC converter. The converter includes a power factor corrector (PFC) 20 having input terminals 11, 12 for receiving an AC input voltage $V_{IN}$ and output terminals 13, 14 for providing a first output voltage $V_{OUT1}$. A DC/DC converter 40 is coupled to the PFC 20 such that the DC/DC converter 40 receives, as an input voltage, the first output voltage $V_{OUT1}$. Input terminals of the DC/DC converter 40 correspond to the output terminals 13, 14 of the PFC. The DC/DC converter 40 is configured to generate a second output voltage $V_{OUT2}$ from the first output voltage $V_{OUT1}$ of the PFC 20. The second output voltage $V_{OUT2}$ is a DC voltage and is available at output terminals 15, 16 of the DC/DC converter 40. The second output voltage $V_{OUT2}$ may be used to supply a load Z (illustrated in dashed lines in FIG. 1).

A capacitor 30 (often referred to as DC link capacitor) is connected between the output terminals 13, 14 of the PFC 20. However, by virtue of a specific operating principle of the DC/DC converter 40 the capacitance of this capacitor 30 can be relatively small as compared to conventional AC/DC converters. According to one exemplary embodiment, the capacitance of the output capacitor 30 of the PFC 20 is only approximately between 0.001 ($10^{-3}$) times and 0.01 ($10^{-2}$) times the capacitance of the output capacitor of a conventional AC/DC converter.

Figure 2:
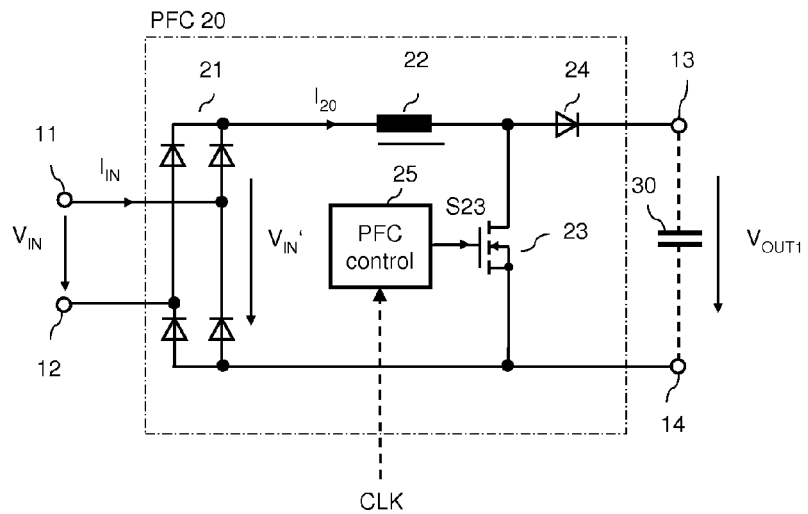
FIG. 2 illustrates an embodiment of the PFC.

The PFC 20 can be implemented like a conventional PFC. Just for illustration purposes, an example of the PFC 20 is illustrated in greater detail in FIG. 2. Referring to FIG. 2, the PFC 20 may include a rectifier circuit 21, such as a bridge rectifier, connected to the input terminals 11, 12. The rectifier circuit 21 receives the input voltage $V_{IN}$ and transforms the input voltage $V_{IN}$ into a corresponding rectified input voltage $V_{IN}'$. When, for example, the input voltage $V_{IN}$ has a sine waveform, the rectified input voltage $V_{IN}'$ has a waveform corresponding to the absolute value of a sine wave. The PFC 20 further has a boost converter stage that receives the rectified input voltage $V_{IN}'$ and generates the first output voltage $V_{OUT1}$. The boost converter stage includes a series circuit including an inductor 22, such as a choke, and an electronic switch 23. This series circuit is coupled to the rectifier arrangement 21 such that the rectified input voltage $V_{IN}'$ is available across the series circuit. The electronic switch 23 is, for example, a transistor, in particular a MOSFET, as illustrated in FIG. 2. However, the use of a MOSFET, specifically of an n-MOSFET, as the electronic switch 23 is only an example. Any other switching component, such as a p-MOSFET, an IGBT (insulated gate bipolar transistor), a BJT (bipolar junction transistor), a JFET (junction field-effect transistor) or a GTO (Gate Turn-Off Thyristor) may be used as well. The same applies to other electronic switches that will be explained herein below.

The PFC 20 further includes a rectifier element 24 connected between a circuit node that is common to the inductor 22 and the electronic switch 23 and one (13) of the output terminals 13, 14. The rectifier element 24 can be implemented as a diode (as illustrated in FIG. 2). However, the rectifier element could also be implemented as a synchronous rectifier (SR) using switching components.

The electronic switch 23 may receive an on/off-modulated, e.g., a pulse-width modulated (PWM), drive signal S23 from a PFC controller 25. The PFC controller 25 can be a conventional PFC controller that generates the on/off-modulated drive signal (such as PWM drive signal S23 of FIG. 2) such that the power factor is close to 1, such as between 0.97 and 1, and such that an output voltage (such as the first output voltage $V_{OUT1}$ in FIG. 2) at least approximately matches a desired voltage, such as, for example, 400V. The on/off-modulated drive signal S23 is, for example, generated with a frequency (fixed or variable) that is dependent on a clock signal CLK (illustrated in dashed lines in FIG. 2). This clock signal CLK may be an external clock signal generated by an external clock signal generator (not shown), or may be a clock signal generated in the PFC controller. Such conventional PFC controllers are as such known so that no further explanations are required in this regard.

Again referring to FIG. 1, the DC/DC converter 40 includes a switching unit 50 coupled to the output terminals 13, 14 of the PFC 20, and an inductive rectifier 60 connected between the switching unit 50 and the output terminals 15, 16. The switching unit 50 includes at least one electronic switch, such as a transistor, and is configured to generate a clocked voltage (or square wave voltage) $V_C$ from the first output voltage $V_{OUT1}$. The clocked voltage may generated in accordance with an on/off-modulated, e.g., pulse-width modulated (PWM) drive signal $S_D$, so that a frequency and/or a duty cycle and/or a phase of the clocked voltage $V_C$ corresponds to a frequency and/or a duty cycle and/or a phase of the drive signal $S_D$, respectively. The drive signal $S_D$ is generated by a control circuit 70 in a manner that will be explained in further detail herein below.

The inductive rectifier 60 includes at least one inductive element, such as, e.g., a choke and/or a transformer or elements coupled without cables, and at least one rectifier element, such as, e.g., a bipolar diode, a Schottky diode, or a synchronous rectifier. The inductive rectifier 60 is configured to rectify the clocked voltage $V_C$ in order to generate the second output voltage $V_{OUT2}$, which is a DC voltage.

The operating principle of the control circuit 70 that generates the at least one drive signal $S_D$ will now be explained. For explanation purposes it will be assumed that the input voltage $V_{IN}$ has a sine waveform, that is $$V_{IN} = V_0 \cdot \sin(\omega \cdot t), \quad (1)$$

wherein $V_0$ is the amplitude, and wherein $\omega = 2\pi \cdot f$. The input voltage $V_{IN}$ may be a voltage provided by a power grid. Dependent on the country, the amplitude $V_0$ is, for instance, 155V (110 $V_{RMS}$) or 325V (230 $V_{RMS}$). The frequency f is usually 50 Hz or 60 Hz, $\omega$ is the corresponding angular frequency (usually measured in radians per second, rad/s).

An input current $I_{IN}$ resulting from this input voltage $V_{IN}$ is:

$$I_{IN} = I_0 \cdot \sin(\omega \cdot t + \sigma), \quad (2)$$

wherein $I_0$ is an amplitude of the input current and $\sigma$ is a phase shift between the input voltage $V_{IN}$ and the corresponding input current $I_{IN}$. For explanation purposes it is further assumed that a power factor of the PFC 20 is close to 1, such as between 0.97 and 1. In this case, the phase-shift $\sigma$ is approximately 0. An input power $P_{IN}$ of the PFC 20 is then given as:

$$P_{IN} = V_{IN} \cdot I_{IN} = V_0 \cdot I_0 \cdot \sin^2(\omega \cdot t) = \frac{1}{2} \cdot V_0 \cdot I_0 \cdot (1 - \cos(2 \cdot \omega \cdot t)). \quad (3)$$

In accordance with equation (3), the input power $P_{IN}$ varies between a maximum input power $P_{INmax}$, with $P_{INmax} = V_0 \cdot I_0$, and a minimum input power, which is zero, at an angular frequency $2\omega$ which is twice the angular frequency of the input voltage $V_{IN}$.

In a conventional AC/DC converter the DC/DC converter, which is coupled to the PFC, has a constant input power, so that a relatively large output capacitor of the PFC is required in order to buffer variations of the input power of the PFC 20 and to reduce ripples of the output voltage of the PFC 20.

In the AC/DC converter of FIG. 1, the control circuit 70 is configured to drive the switching arrangement 50 such that an instantaneous value of the input power of the DC/DC converter 40 approximately equals—neglecting the losses—the instantaneous input power of the PFC 20. The input power $P_{IN40}$ of the DC/DC converter equals the output power $P_{OUT20}$ of the PFC ($P_{IN40} = P_{OUT20}$). Further, the output power $P_{OUT20}$ of the PFC 20 equals its input power $P_{IN}$ ($P_{IN} = P_{OUT20}$). The PFC 20 is configured to provide a DC output voltage $V_{OUT1}$. Thus, in order for the input power $P_{IN40}$ of the DC/DC converter to be equal to the output power $P_{OUT20}$ of the PFC 20, an input current $I_{40}$ of the DC/DC converter 40 should be as follows:

$$I_{40} = P_{IN40}/V_{OUT1} = P_{OUT20}/V_{OUT1} = P_{IN}/V_{OUT1} \quad (4)$$
$$= V_0 \cdot I_0 \cdot \sin^2(\omega \cdot t)/V_{OUT1} = V_0 \cdot I_0 \cdot (1 - \cos(2 \cdot \omega \cdot t))/(2 \cdot V_{OUT1}).$$

Thus, the control circuit 70 drives the switching arrangement 50 such that the moving average of the input current $I_{40}$ of the DC/DC converter 40 has a waveform that corresponds to the waveform of the input power $P_{IN}$ of the PFC 20. In general, the control circuit 70 is configured to drive the switching arrangement 50, by providing the at least one drive signal $S_D$, such that the drive signal $S_D$ is dependent on a reference signal $S_{REF}$, where the reference signal $S_{REF}$ has a frequency that is dependent on the frequency of the AC input voltage. Thus, when the input voltage $V_{IN}$ is a sine wave voltage, the reference signal $S_{REF}$ is a squared sine signal. According to one embodiment, the reference signal $S_{REF}$ is derived from the input voltage $V_{IN}$ or the input current $I_{IN}$ of the PFC 20, so that the waveform of the reference signal $S_{REF}$ is in phase with the waveform of the input power $P_{IN}$ of the PFC.

In order to control the input current $I_{40}$ of the DC/DC converter 40 the control circuit 70 receives an input current signal $S_C$ that is representative of the input current $I_{40}$. The input current signal $S_C$ can be obtained by measuring the input current $I_{40}$. In the example illustrated in FIG. 1, a current measurement circuit 71 that is coupled to the load path of the DC/DC converter 40 provides the current measurement signal $S_C$. However, measuring the input current in order to obtain the input current signal $S_C$ is only an example. The input current $I_{40}$ could also be estimated or derived from another parameter, such as a voltage across individual elements of the inductive rectifier 60, a detailed example of which will be explained with reference to FIG. 3. According to one embodiment, the current measurement signal $S_C$ is proportional to the input current $I_{40}$.

The switching arrangement 50 is switched on and off dependent on the PWM drive signal $S_D$, so that, according to one embodiment, the square wave voltage $V_C$ has a duty cycle corresponding to the duty cycle $S_D$ of the drive signal. The input current $I_{40}$ is not a continuous current, but is cyclically switched on and off dependent on the drive signal $S_D$. However, a switching frequency, which is a frequency of the drive signal $S_D$, is significantly higher than the frequency of the desired variations of the input current $I_{40}$, and thus a mean value (moving average) of the input current $I_{40}$ meets eqn. (4). While the frequency of the variations of the input power $P_{IN}$ of the PFC 20 and, therefore, the desired variations of the input current $I_{40}$ of the DC/DC converter 40 is twice the frequency of the input voltage $V_{IN}$, e.g. 100 Hz or 120 Hz, a frequency of the drive signal $S_D$ is much higher. According to one embodiment, the switching frequency is in the range of several kilohertz (kHz) and is, therefore, much faster than the desired variations of the input current $I_{40}$.

By controlling the input current $I_{40}$ of the DC/DC converter 40 such that the input current varies in accordance with variations of the input power $P_{IN}$ of the PFC 20 an energy buffer at the output of the PFC 20 is not required, or only a smaller energy buffer is required. Thus, the capacitor 30 at the output of PFC 20 could be omitted, or the capacitance of this output capacitor 30 can be significantly lower (e.g. by a factor 100 or even 1000) than the capacitance usually required at the output of a conventional PFC.

Figure 3:
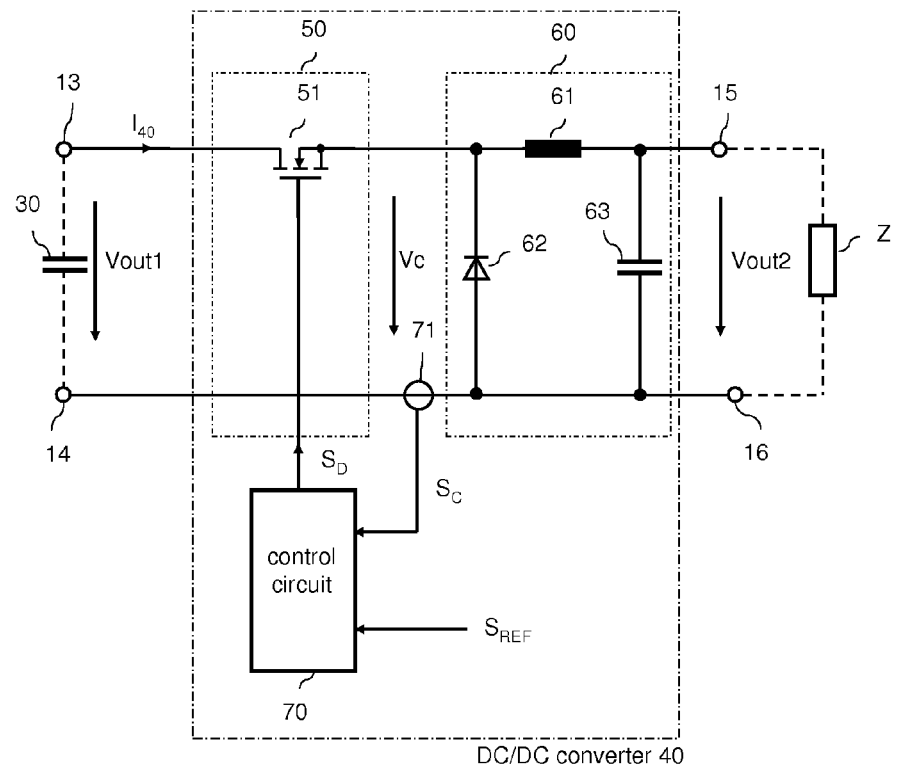
FIG. 3 illustrates an embodiment of a DC/DC converter having a buck converter topology.

The DC/DC converter can be implemented with a conventional DC/DC converter topology. FIG. 3 illustrates a simplified embodiment in which the DC/DC converter 40 has a buck converter topology. In this exemplary embodiment the switching arrangement 50 includes one electronic switch 51. The electronic switch 51 has a load path that is connected to one of the input terminals 13, 14 and has a control terminal for receiving the drive signal $S_D$. In the embodiment according to FIG. 3, the electronic switch 51 is implemented as a MOSFET, specifically as an n-type MOSFET. However, this is only an example, and any other type of electronic switch may be used as well. In the example of FIG. 3, the electronic switch 51 is connected to the first input terminal 13 of the DC/DC converter 40.

In accordance with the present example, the inductive rectifier 60 includes a series circuit including an inductor 61 such as, for example, a choke, and a capacitor 63. This series circuit including the inductor 61 and the capacitor 63 is connected in series with the electronic switch 51 such that the inductive element 61 is connected between the electronic switch 51 and one of the output terminals 15, and such that the capacitive element 63 is connected between the output terminals 15, 16, so that the output voltage $V_{OUT2}$ is available across the capacitor 63. A second input terminal 14 and a second output terminal 16 are electrically coupled with each other, wherein in the embodiment of FIG. 3 only the current measurement circuit 71 is connected between these terminals 14, 16. The inductive rectifier 60 further includes a rectifier element 62 connected in parallel with the series circuit including the inductor 61 and the capacitor 63.

The operating principle of the DC/DC converter 40 illustrated in FIG. 3 is discussed below. The electronic switch 50 is cyclically switched on and off by the on/off-modulated drive signal $S_D$. When the electronic switch 51 is in its on-state, the output voltage $V_{OUT1}$ of the PFC (20 in FIG. 1), which also is the input voltage of the DC/DC converter 40, is applied to the inductive rectifier 60. Through this, the input current $I_{40}$, which is the current through the inductor 61, increases until the electronic switch 51 is switched off. While the electronic switch 51 is switched off, the rectifier element 62 acts as a freewheeling element that takes over the current through the inductor 61, wherein the current through the inductor 61 decreases during the off-state of the electronic switch 51.

The input current $I_{40}$ of the DC/DC converter, in particular a mean value of the input current $I_{40}$, can be regulated through the modulated drive signal $S_D$, by suitably adjusting a duty cycle of the drive signal $S_D$ dependent on the current measurement signal $S_C$ and the reference signal $S_{REF}$.

Figure 4:
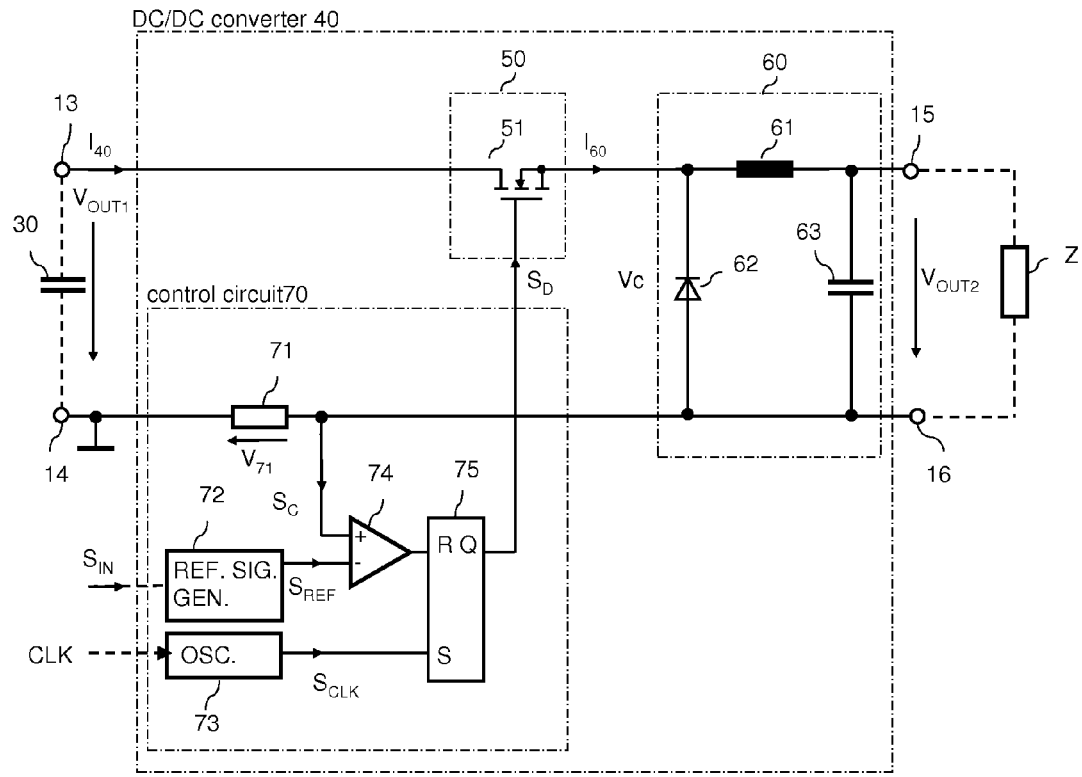
FIG. 4 illustrates the DC/DC converter of FIG. 3 wherein a control circuit of a switching element is illustrated in detail.

An exemplary embodiment of the control circuit 70 that is configured to generate the drive signal $S_D$ such that the input current $I_{40}$ of the DC/DC converter 40 at least approximately matches the waveform of the reference signal $S_{REF}$ is illustrated in FIG. 4. The control circuit 70 includes an oscillator 73 providing a clock signal $S_{CLK}$. This clock signal $S_{CLK}$ defines a frequency of the PWM drive signal $S_D$. In the control circuit of FIG. 4, the clock signal $S_{CLK}$ is received at a set input S of an SR flip-flop 75 (also referred to as SR latch). The drive signal $S_D$ is available at a non-inverting output Q of the flip-flop 75. Optionally, a driver (not illustrated) is connected between the output Q of the flip-flop 75 and the control terminal of the electronic switch 51. This driver amplifies the logic signal available at the output of the flip-flop 75 to a signal level that is suitable to drive the electronic switch 51. According to one embodiment, the clock signal $S_{CLK}$ provided by the oscillator 73 is synchronized with the clock signal CLK that governs generation of the PWM signal in the PFC. For this, the oscillator 73 may receive the clock signal CLK.

The control circuit 70 further includes a comparator 74 that receives the reference signal $S_{REF}$ at a first input and the current measurement signal $S_C$ at a second input. In the embodiment of FIG. 4, the first input is an inverting input of the comparator 74, and the second input is a non-inverting input of the comparator. The reference signal $S_{REF}$ is provided by a reference signal generator 72. Some exemplary implementations of the reference signal generator 72 will be illustrated in FIG. 7 and the subsequent figures. According to one embodiment, the reference signal generator generates the reference signal $S_{REF}$ dependent on an input signal $S_{IN}$. The input signal $S_{IN}$ represents one of the input voltage $V_{IN}$ and the input current $I_{IN}$ of the PFC. According to one embodiment, the input signal $S_{IN}$ is proportional to one of the input voltage $V_{IN}$ and the input current $I_{IN}$. According to one embodiment, the reference signal $S_{REF}$ is proportional to the square of the input signal $S_{IN}$, so that $$S_{REF} \sim S_{IN}^2. \quad (5)$$

If, the input signal $S_{IN}$ is proportional to the input voltage Vin, then, referring to equation (1), the following applies:

$$S_{REF} \sim V_0^2 \cdot \sin^2(\omega t). \quad (6)$$

In the embodiment of FIG. 4, the current measurement unit 71 is implemented as a shunt resistor 71. The current measurement signal $S_C$ is a voltage $V_{71}$ across the shunt resistor 71. In this embodiment, the shunt resistor 71 is connected to the second input terminal 14 of the DC/DC converter 40. This second input terminal 14 is, for example, coupled to a reference potential, such as ground, which is also the reference potential of the control circuit 70. Thus, it is sufficient to couple one of the terminals of the shunt resistor 71 to the second input terminal of the comparator 74 in order to receive the voltage $V_{71}$ at the second terminal of the comparator 74.

A comparator signal, that is available at an output of the comparator 74, is received at a reset input R of the flip-flop 75. While the clock signal $S_{CLK}$ (defines the frequency of the drive signal $S_D$, the comparator signal 74 defines the duty cycle of the drive signal $S_D$, wherein the duty cycle is adjusted such that the waveform of the input current $I_{40}$, which is represented by the current measurement signal $S_C$, follows the reference $S_{REF}$.

Figure 5:
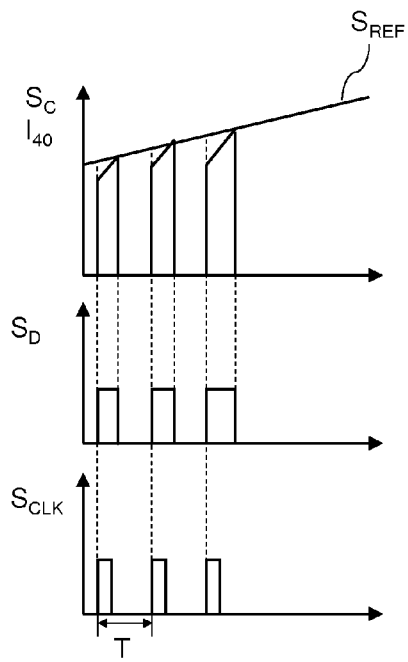
FIG. 5 shows timing diagrams illustrating the operating principle of the control circuit of FIG. 4.

The operating principle of the exemplary control circuit 70 of FIG. 4 will be explained with reference to FIG. 5 in which timing diagrams of the current measurement signal $S_C$ (that represents the input current $I_{40}$) the clock signal $S_{CLK}$, and the drive signal $S_D$ are illustrated. It should be noted that the DC/DC converter 40 can be operated in continuous current mode (CCM, also "continuous conduction mode") or in discontinuous current mode (DCM, also "discontinuous conduction mode"). In CCM, the current through the inductive element 61 does not decrease to 0 when the electronic switch 51 is switched off, so that the input current $I_{40}$ (as illustrated in FIG. 5) has an approximately trapezoid waveform. In DCM the current through the inductive element 61 drops to 0 when the electronic switch 51 is in its off-state. In this case, the input current I40 has an approximately triangular waveform (not shown).

In the control circuit 70 of FIG. 4, the drive signal $S_D$ changes to an on-level, which switches the electronic switch 51 on, every time a signal pulse of the clock signal $S_{CLK}$ occurs (and sets the SR-latch 75). A frequency $f_{CLK}$ of the clock signal $S_{CLK}$, therefore, defines the switching frequency of the drive signal $S_D$. A clock period of the clock signal $S_{CLK}$ is $T_{CLK}$ and thus the clock frequency $f_{CLK}$ is $T_{CLK}^{-1}$. In FIG. 5, an on-level of the drive signal $S_D$ is a high signal level or a logic "1" level. However, this is only an example. An on-level of the drive signal $S_D$ could also be a low level depending on the actual implementation of the circuit.

When the drive signal $S_D$ assumes an on-level, the electronic switch 51 is switched on, and thus the input current $I_{40}$ increases. The electronic switch 51 is switched off, when the input current signal $S_C$ reaches the reference signal $S_{REF}$. The frequency of the reference signal $S_{REF}$ is much smaller than the switching frequency of the drive signal $S_D$, and since only several drive periods of the drive signal $S_D$ are illustrated in FIG. 5, FIG. 5 only shows a small portion of one period of the reference signal $S_{REF}$. The regulation provided by the control circuit 70 causes the duty cycle $S_D$ of the drive signal to increase when the reference signal $S_{REF}$ increases, and causes the duty cycle to decrease, when the reference signal $S_{REF}$ decreases, wherein a moving average of the input current $I_{40}$ increases when the duty cycle increases, and the moving average of the input current $I_{40}$ decreases, when the duty cycle decreases. The moving average is an average of the input current on one or more drive cycles or drive periods T, such as between 1 and 10 drive cycles. Thus, a waveform of a moving average of the input current $I_{40}$ follows the waveform of the reference signal $S_{REF}$. The control circuit 70 therefore acts as a current controller that controls the input current $I_{40}$ of the DC/DC converter such that a signal waveform of a moving average of the input current $I_{40}$ corresponds to a waveform of the reference signal $S_{REF}$, wherein the waveform of the reference signal represents the waveform of the input power $P_{IN}$ of the PFC 20.

In the AC/DC converter described above, the instantaneous energy delivered by the PFC 20 is, except losses, the same as the instantaneous energy received by the DC/DC converter 40 during the switching periods.

In the AC/DC converter explained above, the output voltage $V_{OUT1}$ of the power factor corrector 20 and the input current $I_{40}$ of the DC/DC converter are controlled. However, there is no control of the output voltage $V_{OUT2}$ of the DC/DC converter. An AC/DC converter of that kind can, e.g., be used to supply an electric load Z that defines the output voltage $V_{OUT2}$ itself such as, e.g. an accumulator or a battery to be charged. The AC/DC converter may therefore be used as a battery charger.

Figure 6:
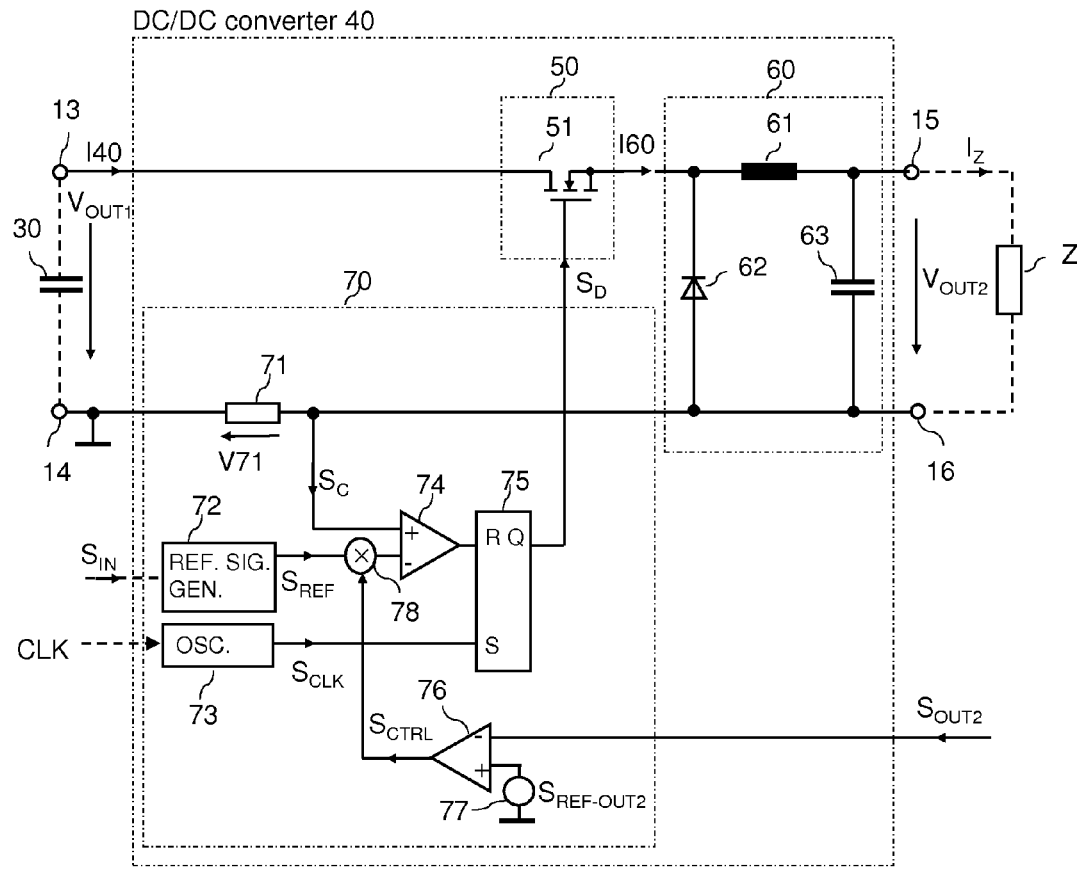
FIG. 6 illustrates as further embodiment a DC/DC converter having a buck converter topology.

FIG. 6 illustrates an embodiment of a control circuit 70 that is not only capable of controlling the input current $I_{40}$ dependent on the reference signal $S_{REF}$, but that is also capable of regulating the output voltage $V_{OUT2}$. However, instead of the output voltage $V_{OUT2}$, also the output current or the output power of the DC/DC converter could be regulated. In this exemplary embodiment, the control circuit 70 includes a controller 76 that receives an output signal $S_{OUT2}$ and a further reference signal $S_{REF-OUT2}$. The output signal $S_{OUT2}$ is dependent on (and representative of) the output voltage $V_{OUT2}$. In particular, the output signal $S_{OUT2}$ is proportional to the output voltage $V_{OUT2}$. The output signal $S_{OUT2}$ can be generated from the output voltage $V_{OUT2}$ in a conventional manner using, for example, a voltage divider (not shown). The further reference signal $S_{REF-OUT2}$ is provided by a reference voltage source 77. The further reference signal $S_{REF-OUT2}$ represents the desired voltage value of the output voltage $V_{OUT2}$. The controller 76 provides a control signal $S_{REF-OUT2}$ from a difference between the output signal $S_{OUT2}$ and the further reference signal $S_{REF-OUT2}$. The controller 76 is, for example, an integral controller (also referred to as I-regulator) or a proportional plus integral controller (also referred to as PI-regulator). A multiplier 78 receives the control signal $S_{CTRL}$ and the reference signal $S_{REF}$ and provides a signal that represents the product of these two signal $S_{CTRL}$, $S_{REF}$ to the first input terminal of the comparator 74. When, for example, the output voltage Vout2 falls below the desired voltage value, so that the output signal Sout2 falls below the further reference signal $S_{REF-OUT2}$, the control signal $S_{CTRL}$ increases, and a signal level of the signal at the first input of the comparator 74 generally increases. This results in an overall increase of the duty cycle of the drive signal $S_D$. This overall increase of the duty cycle $S_D$ causes the mean value of the input current I40 to increase, so as to counteract the decrease of the output voltage Vout2. It should be noted in this connection that the controller 76 is implemented such that variations of the control signal $S_{CTRL}$ have a frequency that is much lower than the switching frequency of the drive signal $S_D$. When the output voltage Vout2 rises above the desired voltage value, the output signal Sout2 rises, so that the control signal $S_{CTRL}$ decreases and the input signal at the first input of the comparator 74 generally decreases. Thus the duty cycle of the drive signal $S_D$ generally decreases and the mean value of the input current $I_{40}$ decreases.

The control circuit 70 of FIG. 6 has two control loops: a first control loop that controls the input current $I_{40}$ to have a waveform corresponding to the waveform of the reference signal $S_{REF}$; and a second control loop that, by scaling the reference signal $S_{REF}$, is configured to generally increase or decrease the duty cycle of the drive signal $S_D$ in order to control the output voltage $V_{OUT2}$. Instead of the output voltage $V_{OUT2}$, an output current $I_Z$ or an output power could be regulated by generating the control signal $S_{CTRL}$ dependent on the output current $I_Z$ or the output power. The output power is the product of the output voltage $V_{OUT2}$ and the output current $I_Z$.

Figure 7:
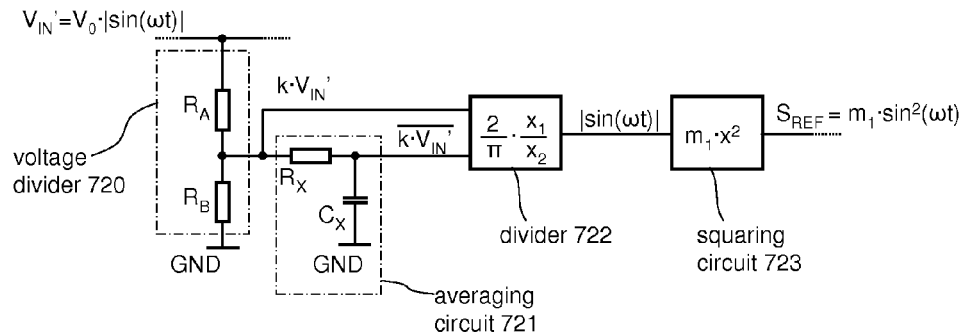
FIG. 7 illustrates one exemplary implementation of the reference signal generator shown in FIG. 6.

FIG. 7 illustrates one exemplary implementation of the reference signal generator 72 shown in FIG. 6 which is, in general, configured to generate a reference signal $S_{REF}$ that is (approximately) proportional to a $\sin^2(\omega t)$ signal, which may be derived from (cf. eqn. (1)) the input voltage $V_{IN}=V_0 \cdot \sin(\omega t)$. In accordance with the example of FIG. 7 the rectified input voltage $V_{IN}'=V_0 \cdot |\sin(\omega t)|$ is used as a basis to generate the reference signal $S_{REF}$. A fractional voltage $k \cdot V_{IN}'$ is tapped at the output circuit node of a voltage divider 720 that is composed of the resistors $R_A$ and $R_B$ and connected between the output terminals of the bridge rectifier 21 (see FIG. 2) in order to provide a fraction (k<1) of the rectified input voltage $V_{IN}'$ at the voltage divider output circuit node. The fractional voltage $k \cdot V_{IN}'$ is supplied to an averaging circuit 721 that is configured to provide a signal representing the average of the rectified input voltage $V_{IN}'$. In the present example the averaging circuit is an RC low-pass composed of the resistor $R_X$ and the capacitor $C_X$. As the input voltage has a sinusoidal waveform, the average of the rectified input voltage is $(2k/\pi) \cdot V_0$. The fractional voltage $k \cdot V_{IN}'=k \cdot V_0 \cdot |\sin(\omega t)|$ is supplied as input $x_1$ (nominator) to a divider circuit 722, while the averaged rectified signal $(2k/\cdot) \cdot V_0$ is supplied to the divider circuit as input $x_2$ (denominator). The divider circuit additionally provides a gain $2/\pi$ and thus the output of the divider circuit 722 is $(2/\pi) \cdot x_1/x_2$ which is $|\sin(\omega t)|$. The output signal of the divider 722 is supplied to a squaring circuit 723 which is configured to square the input signal and to provide a scaled (scaling factor $m_1$) version of the squared signal at its output. Thus the squaring circuit 723 generates a signal $S_{REF}=m_1 \cdot \sin^2(\omega t)$, which may be used as reference signal $S_{REF}$ in the example of FIG. 6.

Figure 8:
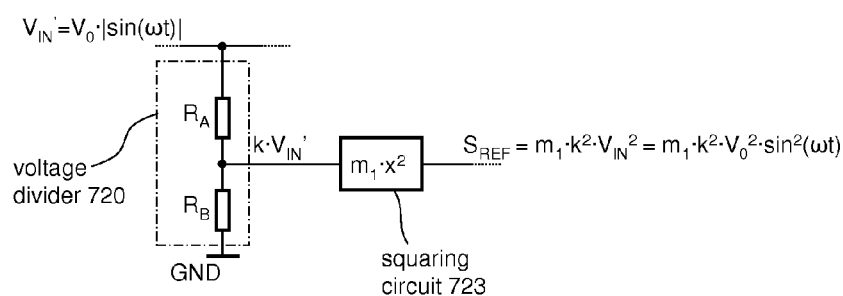
FIG. 8 illustrates a simplified version of the example of FIG. 7.

In cases where the amplitude $V_0$ of the input signal $V_{IN}$ is known, the example of FIG. 7 may be simplified as illustrated in FIG. 8. The example of FIG. 8 also includes a voltage divider 720, which is configured to provide a scaled version of the rectified input voltage $V_{IN}'$, that is $k \cdot V_0 \cdot |\sin(\omega t)|$. Different from the previous example, the voltage divider output signal is directly supplied to a squaring circuit 723, which is configured to square the input signal and to provide a scaled (scaling factor $m_1$) version of the squared signal at its output. In the present example the squaring circuit 723 thus provides at its output a signal $S_{REF}=m_1 \cdot k^2 \cdot V_0^2 \cdot \sin^2(\omega t)$. As the amplitude $V_0$ is know the scaling factor k provided by the voltage divider 720 may be set to $k=V_0^{-1}$ yielding $S_{REF}=m_1 \cdot \sin^2(\omega t)$ which is the same as in the previous example. However, in the previous example, the scaling factor k may be set independently from the amplitude $V_0$.

Figure 9:
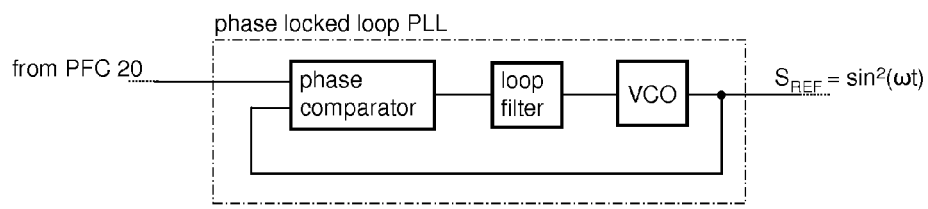
FIG. 9 illustrates another reference signal generator as an alternative to the example of FIG. 7.

FIG. 9 illustrates another, alternative example of the reference signal generator 72 which allows generating a reference signal $S_{REF}$ that is proportional to $\sin^2(\omega t)$, wherein $\omega$ is the angular frequency of the input voltage (e.g. $100\pi$ rad/s or $120\pi$ rad/s). An oscillator VCO with a controllable frequency is used to generate a signal $S_{REF}$ that is proportional to $\sin^2(\omega t)$. The oscillator frequency of the oscillator VCO can be set and adjusted using a phase locked loop PLL (which includes the oscillator). That is, a signal from the PFC that is proportional to the rectified AC input voltage $V_{IN}'=V_0|\sin^2(\omega t)|$ as well as the oscillator output signal $S_{REF}$ are supplied to a phase comparator that generates an error signal. The error signal may be filtered and the filtered error signal is supplied to the oscillator VCO and used to adjust the frequency of the oscillator VCO. The phase locked loop PLL is a closed loop which ensures that the oscillator is in phase with (i.e. phase-locked to) the signal received from the PFC 20 (see FIGS. 1 and 2). Using a PLL for generating the reference signal provides the advantage that the noise present in the AC input signal has no negative impact on the reference signal.

Figure 10:
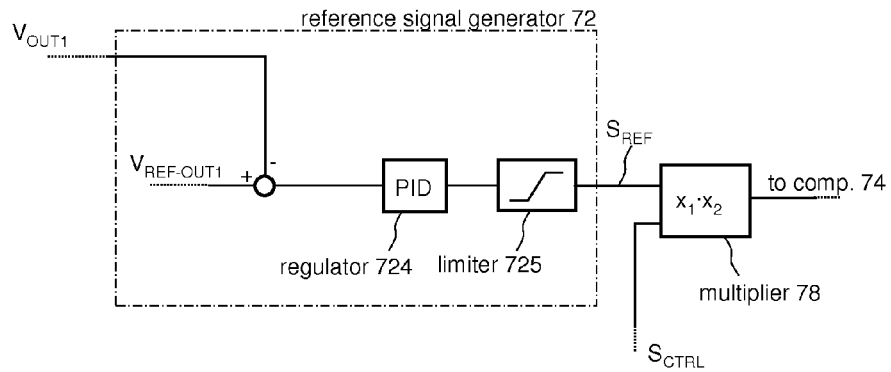
FIG. 10 illustrates another, alternative example of the reference signal generator.

FIG. 10 illustrates another, alternative example of the reference signal generator 72 which allows generating a reference signal $S_{REF}$ that is proportional to $\sin^2(\omega t)$. In the example the output voltage $V_{OUT1}$ of the PFC 20 (which is the input voltage of the DC/DC converter 40, see FIG. 1) is used to provide the reference signal $S_{REF}$. In the present example the reference signal $S_{REF}$ is derived from the output voltage $V_{OUT1}$ of the PFC 20 (corresponds to DC/DC input voltage, see FIG. 6) instead of the input voltage $V_{IN}$ of the PFC 20. The PFC output voltage $V_{OUT1}$ is subtracted from a reference voltage $V_{REF-OUT1}$ which can be regarded as a set-point value for the voltage $V_{OUT1}$. The voltage difference $V_{REF-OUT1}-V_{OUT1}$ is supplied to a regulator circuit 724 which may be implemented as P-regulator (i.e. an amplifier), PI-regulator, or PID-regulator. However, other types of regulators may be also applicable. A limiter 725 is coupled to the regulator downstream thereof and configured to limit the output signal of the regulator circuit 724 to defined maximum and minimum levels. The output signal of the limiter is used as reference signal $S_{REF}$ and supplied to the multiplier 78, which is configured to multiply the reference signal $S_{REF}$ with the control signal $S_{CTRL}$ provided by the regulator 76 (see FIG. 6). The present example provides the advantage that the control loop will keep the DC-link voltage $V_{OUT1}$ approximately at a constant value.

Figure 11:
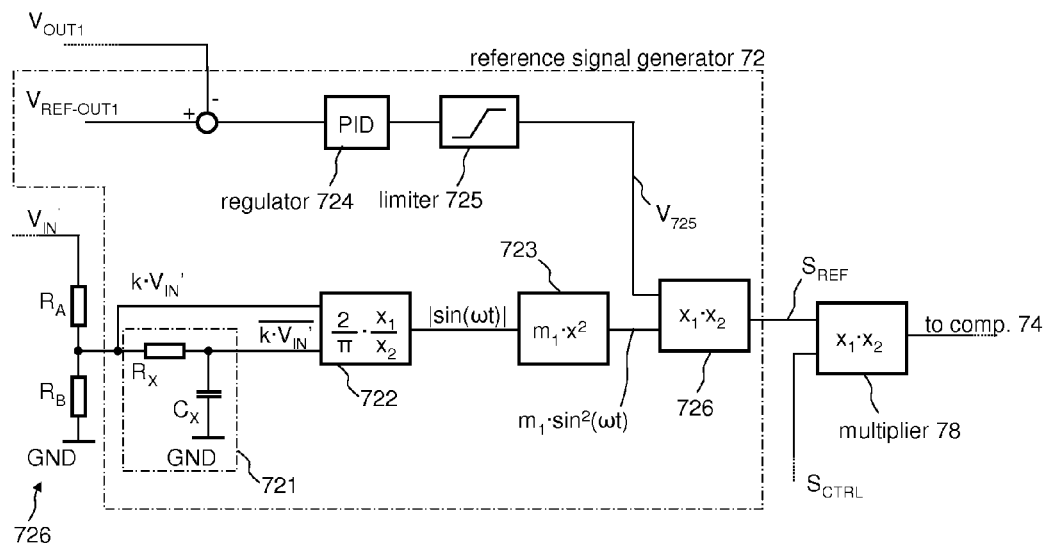
FIG. 11 illustrates another, alternative example of the reference signal generator which may be regarded as a combination of the examples of FIGS. 7 and 10.

FIG. 11 illustrates another, alternative example of the reference signal generator 72 which may be regarded as a combination of the examples of FIGS. 7 and 10. Accordingly, a signal $m_1 \cdot \sin^2(\omega t)$ is derived from the (rectified) PFC input voltage $V_{IN}'$ using the voltage divider 720, the averaging circuit 721, and the divider 723. The latter provides the mentioned signal $m_1 \cdot \sin^2(\omega t)$. The circuit components 721, 722, and 723 have already been discussed above with reference to FIG. 7 and are thus not further explained here in order to avoid repetitions. Further, another voltage signal $V_{725}$ is derived from the PFC output voltage $V_{OUT1}$. Analogously to the example of FIG. 10 the voltage difference $V_{REF-OUT1}-V_{OUT1}$ is supplied to a regulator circuit 724 (e.g. a P-regulator) whose output signal is limited to specific minimum and maximum levels thus providing the limiter output signal $V_{725}$ (which has been taken as reference signal in the previous example of FIG. 10). A further multiplier 726 is coupled to the outputs of the limiter 725 and the squaring circuit 723 and configured to provide, as output signal, the reference signal $S_{REF}=V_{725} \cdot m_1 \cdot \sin^2(\omega t)$, which is, analogously to the previous examples, supplied to the multiplier 78 which scales the reference signal $S_{REF}$ with the control signal $S_{CTRL}$ as already described with reference to FIG. 10. It should be noted that the signal $m_1 \cdot \sin^2(\omega t)$ used in the present example of FIG. 11, which is generated in accordance with the example in FIG. 7, may also be generated in accordance with the example of FIG. 8. In cases in which the amplitude $V_0$ of the AC input signal is known, the signal branch including the components 721, 722, and 723 which generate the signal $m_1 \cdot \sin^2(\omega t)$ may be replaced by a PLL circuit in accordance with the example of FIG. 9.

Figure 12:
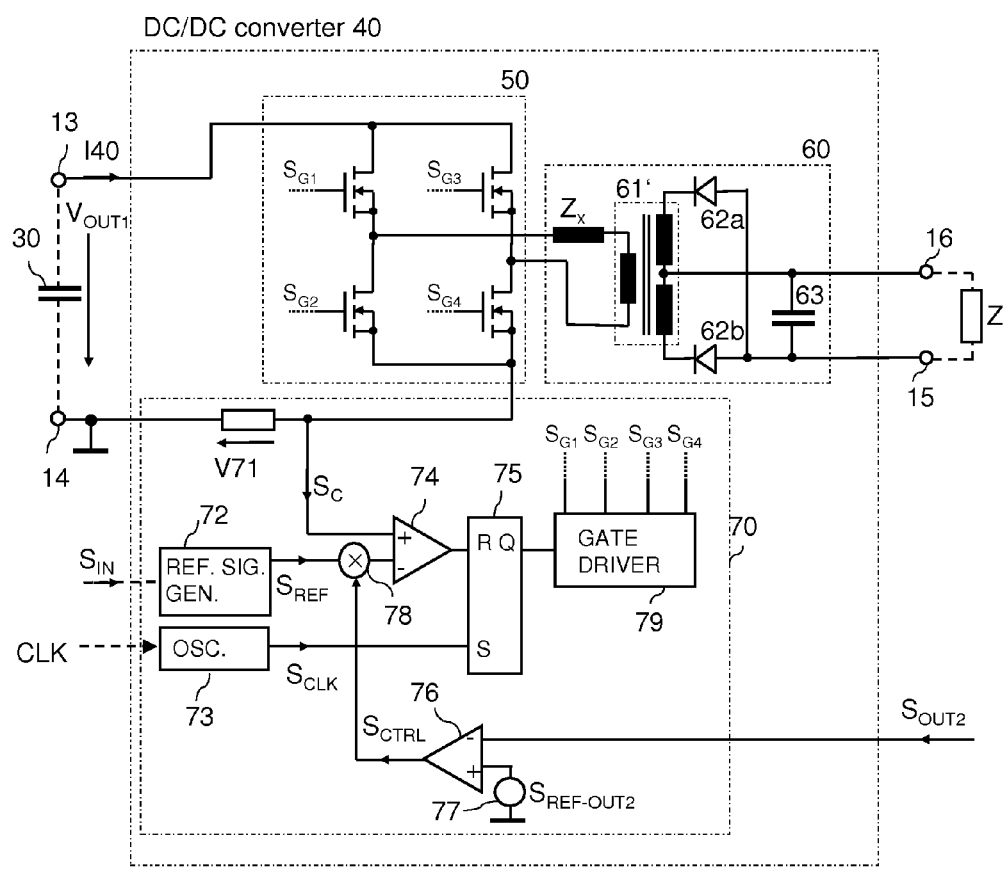
FIG. 12 illustrates as further embodiment a DC/DC converter having a resonant H-bridge converter topology.

It should be noted that using a DC/DC converter 40 having a buck converter topology is only an example. Any other DC/DC converter topology may be used as well. For example, a feed forward converter topology with an H-bridge coupled to a transformer may be used as illustrated in the example of FIG. 12. The circuit of FIG. 12 essentially corresponds to the example of FIG. 6. However, different from the example of FIG. 6 the switching unit 50 is implemented as a H-bridge including two transistor half-bridges, and the inductive rectifier 60 includes a transformer 61' or elements coupled without cables (e.g. at least two magnetically coupled coils) instead of a single inductor 61 (see FIG. 6) to enable a galvanic isolation. The primary winding of the transformer 61' is supplied by the output of the H-bridge 50, and the diodes 62a, 62b are coupled to the secondary winding of the transformer 61' such that the secondary current is rectified The transistors of the H-bridge are driven in accordance with the output of the flip-flop 75 (see also FIG. 6) using a gate driver 79, which is configured to generate the actual drive signals for the transistors dependent on the flip-flop output. The rectified current is smoothed by the capacitor 63 which provides the output voltage at the terminals 15, 16. The control circuit 70 is implemented in the same manner as in the example of FIG. 6; particularly the reference signal generator 72 may be implemented using any of the examples described herein.

Although various exemplary embodiments have been disclosed, it will be apparent to those skilled in the art that changes and modifications can be made according to a specific implementation of the various embodiments and without departing from the spirit and scope of the invention. It will be obvious to those reasonably skilled in the art that other components performing the same functions may be suitably substituted. Particularly, signal processing functions may be performed either in the time domain or in the frequency domain while achieving substantially equal results. It should be mentioned that features explained with reference to a specific figure may be combined with features of other figures, even where not explicitly mentioned. Further, the methods of the invention may be achieved in either all software implementations, using the appropriate processor instructions, or in hybrid implementations that utilize a combination of hardware logic and software logic to achieve the same results. Such modifications to the concept are intended to be covered by the appended claims.

What is claimed is:

1. A power converter, comprising:
   a power factor corrector comprising input terminals for receiving an AC input voltage, and output terminals for providing a first output voltage; and
   a DC/DC converter comprising input terminals coupled to the output terminals of the power factor corrector, and output terminals for providing a second output voltage, the DC/DC converter further comprising:
   a control circuit configured to control an input current of the DC/DC converter dependent on a reference signal, the reference signal having a frequency that is dependent on a frequency of the AC input voltage.

2. The power converter of claim 1, wherein the DC/DC converter further comprises:
   a switching arrangement coupled to the input terminals of the DC/DC converter and having a control terminal for receiving at least one drive signal;
   an inductive rectifier arrangement coupled between the switching arrangement and the output terminals of the DC/DC converter; and
   wherein the control circuit is configured to provide the at least one drive signal for the switching arrangement dependent on the reference signal.

3. The power converter of claim 2, wherein the control circuit comprises:
   an oscillator configured to provide a clock signal with a clock frequency;
   a current evaluation unit configured provide an input current signal that is dependent on the input current of the DC/DC converter;
   a comparator configured to compare the reference signal with the input current signal and to provide a comparator signal; and
   a logic circuit configured to receive the clock signal and the comparator signal and configured to generate the at least one drive signal as a clocked signal with a frequency corresponding to the clock frequency and with a duty cycle that is dependent on the comparator signal.

4. The power converter of claim 1, wherein the control circuit is configured to control the input current of the DC/DC converter such that a moving average of the input current is dependent on the reference signal.

5. The power converter of claim 1, wherein the control circuit includes a reference signal generator coupled to the input terminals of the power factor corrector and configured to provide the reference signal.

6. The power converter of claim 5, wherein the reference signal generator is responsive to the AC input voltage and configured to generate the reference signal such that it has a waveform proportional to a square of a waveform of the AC input voltage.

7. The power converter of claim 6, wherein the reference signal generator includes a phase locked loop to generate a signal having a sinusoidal waveform and being in phase with the AC input voltage.

8. The power converter of claim 5, wherein the reference signal generator receives, as an input, a fraction of a rectified AC input voltage and is configured to:
   generate a signal by averaging the input, thus providing an averaged input,
   generate a signal representing a scaled ratio between the input and the scaled input, thus providing a normalized rectified sine signal, and
   square and scale the normalized rectified sine signal and to provide this signal as the reference signal.

9. The power converter of claim 5 wherein the reference signal generator receives, as input, a fraction of a rectified AC input voltage and is configured to square and scale the input and to provide, as the reference signal, a signal equaling the squared AC input voltage scaled by a first scaling factor.

10. The power converter of claim 1, wherein the control circuit includes a reference signal generator coupled to the output terminals of the power factor corrector and configured to provide the reference signal.

11. The power converter of claim 5,
wherein the reference signal generator is responsive to the AC input voltage and the first output voltage provided by the power factor corrector; and
wherein the reference signal generator is configured to provide a first signal representing a squared AC input voltage and a second signal that depends on a difference between the first output voltage and a corresponding reference voltage, the first signal and the second signal being multiplied and provided as reference signal.

12. The power converter of claim 10, wherein the reference signal generator is responsive to the first output voltage and configured to generate the reference signal dependent on a difference between the first output voltage and a corresponding reference voltage.

13. The power converter of claim 10, wherein the reference signal generator includes a controller supplied with a difference between the first output voltage and a corresponding reference voltage, the reference signal being generated dependent on an output signal of the controller, respectively.

14. The power converter of claim 13 wherein the controller is a P-controller, a PI-controller or a PID-controller.

15. The power converter of claim 1, wherein the control circuit comprises:
a first control loop configured to control the input current dependent on the reference signal and optionally one or more additional control loops.

16. The power converter of claim 1, wherein a moving average of the input current is proportional to the reference signal.

17. The power converter of claim 1, wherein the DC/DC converter is implemented as a buck converter.

18. An AC/DC power conversion method, comprising:
generating a power factor controlled first output voltage from an AC input voltage;
generating a second output voltage from the first output voltage, wherein generating the second output voltage comprises:
providing a reference signal that has a frequency that is dependent on a frequency of the AC input voltage;
generating a clocked voltage from the first output voltage, the clocked voltage having a frequency and a duty cycle, wherein the duty cycle is dependent on the reference signal; and
rectifying the clocked voltage using an inductive rectifier arrangement.

19. The power conversion method of claim 18, wherein the reference signal has a waveform that is proportional to a square of a waveform of the AC input voltage.

20. The power conversion method of claim 18, wherein the reference signal has a sine squared waveform and wherein the frequency of the reference signal is 2-times the frequency of the AC input voltage.

21. The power conversion method of claim 18, wherein the duty cycle of the clocked voltage is further dependent on the second output voltage and a further reference signal.

22. The power conversion method of claim 18, wherein the frequency of the clocked voltage is a fixed frequency.

23. The power conversion method of claim 22, wherein the fixed frequency is a frequency of a clock signal provided by an oscillator.

24. The power conversion method of claim 18, wherein the duty cycle of the clocked voltage is further dependent on an input current of the inductive rectifier arrangement.

25. The power conversion method of claim 18, wherein at least one switching element and the inductive rectifier arrangement are connected in a buck converter topology.

26. The power conversion method of claim 18, wherein providing the reference signal comprises:
providing a fraction of a rectified AC input voltage; and
scaling and squaring the fraction of the rectified AC input voltage to obtain the reference signal.

27. The power conversion method of claim 18, wherein providing the reference signal comprises:
providing a fraction of a rectified AC input voltage;
averaging the fraction of the rectified AC input voltage;
dividing the fraction of the rectified AC input voltage by said average; and squaring a result of the division.

28. The power conversion method of claim 18, wherein providing the reference signal comprises:
generating the reference signal using an oscillator which is synchronized with the AC input voltage using a PLL.

29. The power conversion method of claim 28, wherein the controller is one of: a P-controller, a PI-controller, and a PID-controller.

30. The power conversion method of claim 18, wherein providing the reference signal comprises:
subtracting the power factor controlled first output voltage from a corresponding reference voltage, thus obtaining a voltage difference;
supplying the voltage difference to a controller input of a controller circuit; and
providing a controller output as a reference signal, wherein the controller circuit operates in accordance with a given control law.

31. The power conversion method of claim 18, wherein providing the reference signal comprises:
subtracting the power factor controlled first output voltage from a corresponding reference voltage, thus obtaining a voltage difference;
supplying the voltage difference to a controller input of a controller circuit; and
multiplying a controller output with a sinusoidal signal being in phase with the AC input voltage and having a frequency being twice the frequency of the AC input voltage.

* * * * *

UNITED STATES PATENT AND TRADEMARK OFFICE
CERTIFICATE OF CORRECTION

PATENT NO.       : 8,503,205 B2
APPLICATION NO.  : 13/662046
DATED            : August 6, 2013
INVENTOR(S)      : Carletti et al.

Page 1 of 1

It is certified that error appears in the above-identified patent and that said Letters Patent is hereby corrected as shown below:

On the Title Page, item (71) Applicants, 1st line, delete "Andrea Carletti, Munich (DE); Albino Pidutti, Villach (AT)", and insert --Infineon Technologies, AG, Neubiberg (DE)--.

On the Title Page, item (63) Related U.S. Application Data, 2nd line, delete "May 27, 2012" and insert --May 27, 2011, now Patent No. 8,493,757--.

Signed and Sealed this
Third Day of March, 2015

Michelle K. Lee
*Deputy Director of the United States Patent and Trademark Office*